United States Patent
Jones et al.

(10) Patent No.: US 10,181,598 B2
(45) Date of Patent: Jan. 15, 2019

(54) LITHIUM ION BATTERY CATHODES, METHODS OF MAKING, AND METHODS OF USE THEREOF

(71) Applicant: University of Florida Research Foundation, Inc., Gainesville, FL (US)

(72) Inventors: Kevin S. Jones, Archer, FL (US); Nicholas G. Rudawski, Gainesville, FL (US); Shadi Al Khateeb, Kissimmee, FL (US)

(73) Assignee: UNIVERSITY OF FLORIDA RESARCH FOUNDATION, INC., Gainesville, FL (US)

( * ) Notice: Subject to any disclaimer, the term of this patent is extended or adjusted under 35 U.S.C. 154(b) by 327 days.

(21) Appl. No.: 14/987,878

(22) Filed: Jan. 5, 2016

(65) Prior Publication Data

US 2016/0197338 A1    Jul. 7, 2016

Related U.S. Application Data

(60) Provisional application No. 62/099,675, filed on Jan. 5, 2015.

(51) Int. Cl.
| | | |
|---|---|---|
| *H01M 4/04* | (2006.01) | |
| *H01M 4/66* | (2006.01) | |
| *H01M 4/58* | (2010.01) | |
| *H01M 10/052* | (2010.01) | |
| *H01M 4/02* | (2006.01) | |

(52) U.S. Cl.
CPC ....... *H01M 4/0419* (2013.01); *H01M 4/0404* (2013.01); *H01M 4/0471* (2013.01); *H01M 4/5815* (2013.01); *H01M 4/661* (2013.01); *H01M 10/052* (2013.01); *H01M 2004/028* (2013.01); *Y02T 10/7011* (2013.01)

(58) Field of Classification Search
CPC ............. H01M 4/0419; H01M 10/052; H01M 4/0471; H01M 4/0404; H01M 4/5815; H01M 4/661; H01M 2004/028; Y02T 10/7011
USPC ........................................................ 429/221
See application file for complete search history.

(56) References Cited

U.S. PATENT DOCUMENTS

| | | |
|---|---|---|
| 6,635,942 B2 | 10/2003 | La Vecchia |
| 7,799,311 B2 | 9/2010 | Schimek |
| 7,829,045 B2 | 11/2010 | Sun et al. |
| 2009/0087374 A1* | 4/2009 | Schimek ............... B82Y 30/00 423/565 |

FOREIGN PATENT DOCUMENTS

| | | |
|---|---|---|
| CN | 100440549 | 12/2008 |
| CN | 102642874 | 8/2013 |
| EP | 2289120 | 3/2012 |
| WO | WO 2012/151297 A1 | 11/2012 |

OTHER PUBLICATIONS

Chamberlin, R.R. and J.S. Skarman, Chemical Spray Deposition Process for Inorganic Films. Journal of the Electrochemical Society, 1966. 113(1): p. 86-89.

P.S., Versatility of chemical spray pyrolysis technique. Materials Chemistry and Physics, 1999. Patil 59(3): p. 185-198.

Perednis, D. and L Gauckler, Thin Film Deposition Using Spray Pyrolysis. Journal of Electroceramics, 2005. 14(2): p. 103-111.

V. Yufitb, et al.; "Thin-film iron sulfide cathodes for lithium and Li-ion/polymer electrolyte microbatteries"; School of Chemistry, Tel Aviv University, Tel Aviv 69978, Israel Department of Electrical Engineering—Physical Electronics, Israel Wolfson Applied Materials Research Center; Received Jun. 2, 2003; received in revised form Jan. 5, 2004.

Ayuko Kitajou, Junpei Yamaguchi b, Satoshi Hara, Shigeto Okada; "Discharge/charge reaction mechanism of a pyrite-type FeS2 cathode; for sodium secondary batteries"; Journal of Power Sources; Research and Education Center of Carbon Resources, Kyushu University, 6-1 Kasuga-koen, Kasuga 816-8580, Japan interdisciplinary Graduate School of Engineering Sciences, Kyushu University, Japan.

\* cited by examiner

*Primary Examiner* — Gary D Harris
(74) *Attorney, Agent, or Firm* — Thomas Horstemeyer, LLP

(57) ABSTRACT

Embodiments of the present disclosure provide for cathodes having a metal sulfide thin layer, devices including cathodes, lithium ion batteries including cathodes, methods of making cathodes, and the like.

2 Claims, No Drawings

LITHIUM ION BATTERY CATHODES, METHODS OF MAKING, AND METHODS OF USE THEREOF

CROSS-REFERENCE TO RELATED APPLICATIONS

This application claims the benefit of and priority to U.S. Provisional Application Ser. No. 62/099,675, having the title "LITHIUM ION BATTERY CATHODES, METHODS OF MAKING, AND METHODS OF USE THEREOF," filed on Jan. 5, 2015, the disclosure of which is incorporated herein in by reference in its entirety.

BACKGROUND

Since the pioneering work by Chamberlin and Skarman in 1966 [1] on cadmium sulphide films for solar cell applications and in the area of photoconductivity, many studies have been performed on spray pyrolysis for the preparation of thin films of noble metals, metal oxides, spinel oxides and superconducting compounds [2]; spray pyrolysis was used for the preparation of thin and thick films, and it was employed for the deposition of dense and porous films and for powder production [3]. In general, the cathode current collector in lithium ion batteries is limited to highly corrosion resistant steels as the oxide layer formation is of major concern for electron transport. Thus, there is a need to develop alternatives.

SUMMARY

Embodiments of the present disclosure provide for cathodes having a metal sulfide thin layer, devices including cathodes, lithium ion batteries including cathodes, methods of making cathodes, and the like.

An embodiment of the present disclosure provides for a method of making a lithium ion battery cathode, among others, that includes: providing a cathode at a temperature of about 100° C. to 650° C.; spraying a precursor material onto the cathode using a spray pyrolysis system; and forming a metal sulfide thin layer onto the surface of the cathode. In an embodiment, the method also includes: annealing the cathode having the metal sulfide thin layer, wherein the metal sulfide thin layer can have a thickness of about 0.2 to 1 μm.

An embodiment of the present disclosure provides for a lithium ion battery, among others, that includes: an anode; a cathode having a metal sulfide thin layer deposited by spray pyrolysis and an electrolyte disposed between the anode and the cathode.

Other systems, methods, features, and advantages will be or become apparent to one with skill in the art upon examination of the following drawings and detailed description. It is intended that all such additional apparatus, methods, features and advantages be included within this description, be within the scope of the present disclosure, and be protected by the accompanying claims.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for cathodes having a metal sulfide thin layer, devices including cathodes, lithium ion batteries including cathodes, methods of making cathodes, and the like. Embodiments of the present disclosure can be advantageous since the method of making the cathode uses spray pyrolysis, which is simple, inexpensive, a non-vacuum technique, and has a high deposition rate. Embodiments of the present disclosure can be used in lithium ion batteries, energy storage devices, portable devices, power tools, electric vehicles, and the like.

In an embodiment, the cathode includes a metal sulfide thin layer. In an embodiment, the metal sulfide can include $FeS_2$. In an embodiment, the metal sulfide thin layer can include $FeS_2$ and FeS. As described below, the ratio of $FeS_2$/FeS can be controlled and optimized. In an embodiment, the ratio of $FeS_2$/FeS can be about 1:2 to 1:1.

In an embodiment, the as deposited film can be amorphous and after annealing (e.g., about 400 to 700° C.) in an inert atmosphere (e.g., $N_2$ atmosphere) a mixture of Fe and S compounds can be obtained such as FeS, orthorhombic $FeS_2$ (marcasite) and other compounds. Sulfurization of the annealed films ensured the conversion of the Fe—S compounds into $FeS_2$ pyrite. In an embodiment, the amounts of the FeS in the thin layer can be about 20 to 50% or more in the as deposited films.

In an embodiment, the cathode can include a base and a thin layer disposed on the base. In an embodiment, the cathode base can include stainless steel, Al, Ni, and a combination thereof.

In an embodiment, the metal sulfide layer can include a dopant. In an embodiment, the dopants can be used to control the conductivity (e.g., controlled over several orders of magnitude) and the charge carrier polarity. In an embodiment, the material dopant can include Cu, Ni, Co, Pb, Zn, and As. In an embodiment, the dopant can be about 0.001 to 10 weight % of the metal sulfide thin layer.

In an embodiment, the metal sulfide thin layer can be a continuous layer or can include discontinuities or islands. In an embodiment, the metal sulfide thin layer can cover about 50 to 100% of the active cathode surface of the lithium ion battery. In an embodiment, the metal sulfide thin layer can have a thickness of about 0.2 to 1 μm.

In an embodiment, the cathode of the present disclosure can be used as a cathode to form a device, such as, a lithium battery, for example. In particular, the device can include an anode (e.g., graphite, multi-walled nanotube (MWNT), $TiO_2$, and the like), an electrolyte (e.g., a Li material), and a cathode of the present disclosure, where the electrolyte is disposed between the anode and cathode. In an embodiment, the electrolyte can be a solid electrolyte or a liquid electrolyte.

In an embodiment, the cathode can be made using the following method. A cathode substrate (e.g., stainless steel) at a temperature of about 100° C. to 650° C. is provided in a spray pyrolysis system. In an embodiment, the spray pyrolysis system can be a component in a larger system such as a roll to roll process system. In such a system, the cathode substrate can be heated prior to applying a material to the surface of the cathode substrate. A precursor material can be sprayed onto the cathode surface using a spray pyrolysis system, where the precursor material is atomized and heated up as it is directed towards the surface of the cathode and forms a solid particle. In an embodiment, the solid particles or their vapors (according to the deposition conditions; the latter would produce smoother films) form a metal sulfide (e.g., $FeS_2$) thin layer on the surface of the cathode. In an embodiment, the spray pyrolysis technique may be ultrasonic spray pyrolysis. In an embodiment, the ultrasonic spray pyrolysis can be advantageous for one or more of the following reasons: narrow droplet size distribution, simplicity, high concentration of droplets, and/or droplet size appropriate for spray pyrolysis. Other methods that can be used include air blast, electrostatic, liquid-feed flame, and the like.

In an embodiment, the precursor material can be a fluid that includes the metal sulfur (e.g., $Na_2S_2O_3$, $NH_2CSNH_2$,). In an embodiment, the precursor material for iron can be: $FeCl_3$, $FeSO_4$, or a combination thereof. In addition, another component (liquid or gas) can be used with or in addition to the precursor material to control the formation of the metal sulfide. For example, a sulfur containing gas (e.g. $H_2S$) can be used ($Na_2S_2O_3$, $NH_2CSNH_2$) to drive the formation of $FeS_2$ as opposed to the formation of FeS.

In an embodiment, after the cathode having the metal sulfide thin layer is formed, it can be annealed to optimize the metal sulfide thin layer. In an embodiment, this can be done at about 400-700° C. for about 15 min to 1 hour or about 30 min in a $H_2S$ flow or in an hermetically sealed silica glass container at temperatures of about 200° C. to 350° C. for about 2-3 hours under a sulfur atmosphere.

REFERENCES

1. Chamberlin, R. R. and J. S. Skarman, Chemical Spray Deposition Process for Inorganic Films. Journal of The Electrochemical Society, 1966. 113(1): p. 86-89.
2. Patil, P. S., Versatility of chemical spray pyrolysis technique. Materials Chemistry and Physics, 1999. 59(3): p. 185-198.
3. Perednis, D. and L. Gauckler, Thin Film Deposition Using Spray Pyrolysis. Journal of Electroceramics, 2005. 14(2): p. 103-111.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to how the numerical value determined. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

At least the following is claimed:
1. A lithium ion battery, comprising:
an anode;
a cathode having a metal sulfide thin layer; and
an electrolyte disposed between the anode and the cathode,
wherein the metal sulfide thin layer has a thickness of about 0.2 to 1 μm, wherein the metal sulfide thin layer includes $FeS_2$ and FeS, wherein the ratio of $FeS_2$/FeS is about 1:2 to 1:1.

2. The lithium ion battery of claim 1, wherein the cathode has a base and a thin layer, and the base is a material selected from: stainless steel, Al, Ni, and a combination thereof.

* * * * *